United States Patent
Kim et al.

(10) Patent No.: US 9,712,772 B2
(45) Date of Patent: Jul. 18, 2017

(54) IMAGE SENSOR AND ANALOG TO DIGITAL CONVERTER AND ANALOG TO DIGITAL CONVERTING METHOD THEREOF

(71) Applicants: Jinwoo Kim, Seoul (KR); Kyung-Min Kim, Seoul (KR); Jungho Lee, Gunpo-si (KR); Heesung Chae, Seoul (KR); Seunghoon Jung, Seoul (KR)

(72) Inventors: Jinwoo Kim, Seoul (KR); Kyung-Min Kim, Seoul (KR); Jungho Lee, Gunpo-si (KR); Heesung Chae, Seoul (KR); Seunghoon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 14/459,654

(22) Filed: Aug. 14, 2014

(65) Prior Publication Data
US 2015/0049232 A1   Feb. 19, 2015

(30) Foreign Application Priority Data

Aug. 14, 2013 (KR) .................. 10-2013-0096568

(51) Int. Cl.
| | | |
|---|---|---|
| H04N 5/369 | (2011.01) | |
| H04N 5/335 | (2011.01) | |
| H04N 5/378 | (2011.01) | |
| H04N 5/357 | (2011.01) | |

(52) U.S. Cl.
CPC .......... *H04N 5/378* (2013.01); *H04N 5/3575* (2013.01); *H04N 5/357* (2013.01)

(58) Field of Classification Search
None
See application file for complete search history.

(56) References Cited

U.S. PATENT DOCUMENTS

| | | |
|---|---|---|
| 7,310,452 B2 | 12/2007 | Nam |
| 7,639,290 B2 | 12/2009 | Higuchi et al. |
| 7,679,542 B2 | 3/2010 | Ham et al. |
| 7,859,583 B2 | 12/2010 | Kawaguchi |
| 8,035,717 B2 | 10/2011 | Hisamatsu |
| 8,314,867 B2 | 11/2012 | Barna et al. |
| 8,325,256 B2 | 12/2012 | Egawa |
| 2006/0170795 A1 | 8/2006 | Higuchi et al. |
| 2007/0046802 A1 | 3/2007 | Ham et al. |

(Continued)

FOREIGN PATENT DOCUMENTS

WO   2011/135815 A1   11/2011

*Primary Examiner* — Mark T Monk
(74) *Attorney, Agent, or Firm* — Sughrue Mion, PLLC

(57) ABSTRACT

An image sensor is provided. The image sensor includes a pixel array having active pixel sensors arranged in rows and columns; a correlated double sampler that converts sensing signals transferred from pixels sensors selected from the active pixel sensors to correlated double sampling signals and outputs a conversion result by column; and an analog-to-digital converter that converts the correlated double sampling signals corresponding to plural columns to digital signals using a global code. The analog-to-digital converter includes a column shared operator that performs a digital conversion operation on correlated double sampling signals corresponding to two or more columns of the plural columns.

14 Claims, 14 Drawing Sheets

(56) References Cited

U.S. PATENT DOCUMENTS

| | | |
|---|---|---|
| 2007/0229126 A1 | 10/2007 | Nam |
| 2009/0040352 A1 | 2/2009 | Kawaguchi |
| 2009/0278969 A1 | 11/2009 | Hisamatsu |
| 2010/0013969 A1 | 1/2010 | Ui |
| 2010/0060765 A1* | 3/2010 | Kim ................. G11C 7/065 348/308 |
| 2010/0207798 A1* | 8/2010 | Lim ................. H03K 21/023 341/155 |
| 2011/0074968 A1* | 3/2011 | Kim ................. H03K 23/58 348/222.1 |
| 2011/0080507 A1 | 4/2011 | Iwasa |
| 2011/0085065 A1 | 4/2011 | Egawa |
| 2012/0104232 A1 | 5/2012 | Hwang |
| 2012/0120290 A1 | 5/2012 | Kim |
| 2012/0261552 A1 | 10/2012 | Ikeda |
| 2012/0320246 A1 | 12/2012 | Ikuma et al. |
| 2013/0015329 A1 | 1/2013 | Iwaki |
| 2013/0068931 A1 | 3/2013 | Iwaki et al. |

\* cited by examiner

IMAGE SENSOR AND ANALOG TO DIGITAL CONVERTER AND ANALOG TO DIGITAL CONVERTING METHOD THEREOF

CROSS-REFERENCE TO RELATED APPLICATIONS

This application claims priority from Korean Patent Application No. 10-2013-0096568 filed Aug. 14, 2013, in the Korean Intellectual Property Office, the entire contents of which are hereby incorporated by reference.

BACKGROUND

Field

Devices, apparatuses, methods, and articles of manufacture consistent with the present disclosure relate to an image sensor, and more particularly, to an image sensor using a global counter, an analog-to-digital converter, and an analog-to-digital converting method.

Description of the Related Art

In recent years, the use of mobile devices such as a smart phone, a tablet PC, a digital camera, an MP3 player, an e-book, etc. is exploding. Most mobile devices include one or more image sensors to capture an image. Image sensors may include a charge coupled device (hereinafter, referred to as CCD) image sensor and a CMOS image sensor.

Noise of the CCD image sensor is less than that of the CMOS image sensor. Also, a picture quality of the CCD image sensor is better than that of the CMOS image sensor. However, a driving method of the CMOS image sensor is simple, and the CMOS image sensor is implemented by various scanning methods. Also, since a signal processing circuit is integrated in a single chip, it is possible to fabricate a small-sized product. Since a CMOS process technique is compatibly used, a production cost is lowered. Since power consumption of the CMOS image sensor is very low, it is easy to apply the CMOS image sensor to a mobile device.

The CMOS image sensor includes an analog-to-digital converter that converts an image signal sensed as an analog signal into a digital signal. A pixel array of an image sensor has a plurality of pixels arranged in a two-dimensional matrix form, and each pixel outputs an image signal from a light energy. Each pixel integrates photo-charges corresponding to the amount of light incident through a photo diode and outputs an analog current type of pixel signal according to the integrated photo-charges. The pixel signals are converted into digital signals through the analog-to-digital converter (hereinafter, referred to as ADC).

An ADC circuit is provided for every column line of the pixel array to convert an analog signal from the pixel array of the image sensor into a digital signal. In this case, the number of ADC circuits is controlled by the number of column lines of the pixel array, and as the number increases significant burden in terms of power consumption and area arises. In addition, a large current peak occurs according to ADC operations simultaneously performed at respective columns, and the current peak thus generated acts as a noise of the image sensor.

SUMMARY

According to an aspect of an exemplary embodiment, there is provided an image sensor which comprises a pixel array having a plurality of active pixel sensors arranged in rows and columns; a correlated double sampler configured to convert sensing signals transferred from pixels sensors selected from the plurality of active pixel sensors to correlated double sampling signals and to output a conversion result by column; and an analog-to-digital converter configured to convert the correlated double sampling signals corresponding to a plurality of columns to digital signals using a global code, wherein the analog-to-digital converter comprises a column shared operator that performs a digital conversion operation on correlated double sampling signals corresponding to two or more columns of the plurality of columns.

According to another aspect of an exemplary embodiment, there is provided an analog-to-digital converting method of an image sensor which converts a plurality of correlated double sampling signals sensed from a plurality of active pixel sensors in a correlated double sampling manner to image data, the method comprising comparing the plurality of correlated double sampling signals with a ramp signal; generating a global code provided in common to each of the plurality of columns, the global code being up-counted or down-counted; latching the global code corresponding to each column according to a result of comparing of the plurality of correlated double sampling signals and the ramp signal to acquire a reference code and an image code corresponding to each column; and performing an arithmetic operation on the reference code and the image code corresponding to each column through an adder-subtractor shared by two or more columns in a time-division manner and generating image data corresponding to each column.

According to yet another aspect of an exemplary embodiment, there is provided an analog-to-digital converter of an image sensor that senses an image in a correlated double sampling manner, the analog-to-digital converter comprising a plurality of comparators configured to compare a ramp signal descending with a particular slope, with correlated double sampling signals respectively corresponding to a plurality of columns; a global counter configured to generate a global code output in synchronization with the ramp signal, the global code being up-counted or down-counted; a latch unit configured to latch a global code value corresponding to each column based on an output of each comparator and to store the latched global code value as a reference code and an image code corresponding to each column; a first shared operator configured to sequentially process the reference code and the image code of each of a first group of columns of the plurality of columns and to output the processed result as image data; and a second shared operator configured to sequentially process the reference code and the image code of each of a second group of columns of the plurality of columns and to output the processed result as image data, wherein the first shared operator and the second shared operator simultaneously process image data of a selected column, respectively.

According to yet another aspect of an exemplary embodiment, there is provided an analog-to-digital converting method of an image sensor comprising a plurality of analog-to-digital converters which convert signals sensed from a plurality of pixel sensors to digital image data, the method comprising selecting pixel sensors of the plurality of pixel sensors; converting sensing signals transferred from the selected pixel sensors to correlated double sampling signals by column; converting the correlated double sampling signals of two or more columns to digital signals using a single analog-to-digital converter of the plurality of analog-to-digital converters.

BRIEF DESCRIPTION OF THE FIGURES

The above and other aspects will become apparent from the following description with reference to the following figures, wherein like reference numerals refer to like parts throughout the various figures unless otherwise specified, and in which.

DETAILED DESCRIPTION

Figure 1:
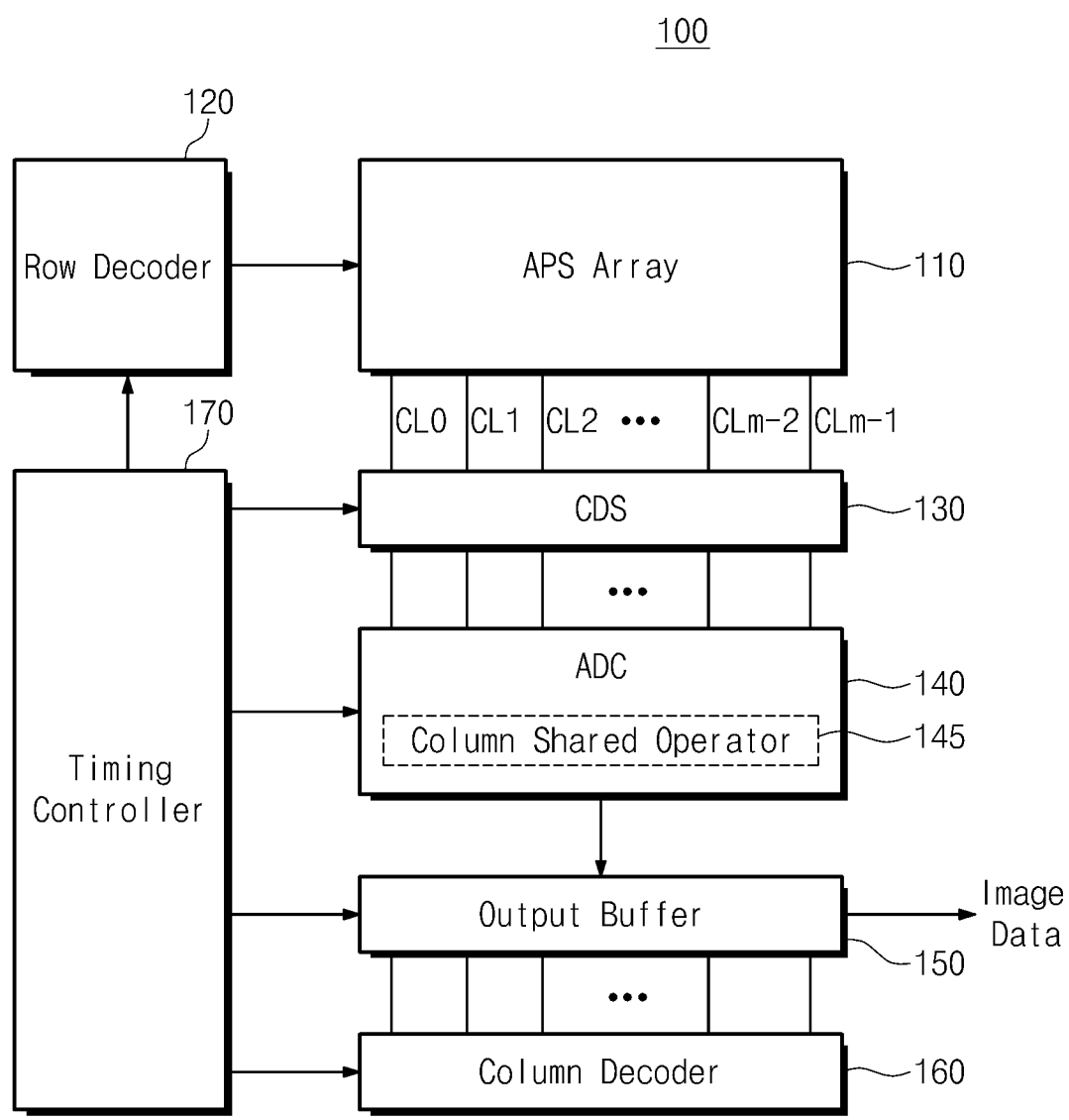
FIG. 1 is a block diagram schematically illustrating an image sensor according to an exemplary embodiment.

Exemplary embodiments will be described in detail with reference to the accompanying drawings. The inventive concept, however, may be embodied in various different forms, and should not be construed as being limited only to the illustrated exemplary embodiments. Rather, these exemplary embodiments are provided as examples so that this disclosure will be thorough and complete, and will fully convey the concept of the inventive concept to those skilled in the art. Accordingly, known processes, elements, and techniques are not described with respect to some of the exemplary embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a CMOS image sensor is exemplarily used to describe aspects and functions of the inventive concepts. However, other merits and performance of the inventive concepts are understood by ones skilled in the art. Also, the inventive concepts may be implemented by other exemplary embodiments or applied to other exemplary embodiments.

In addition, it is apparent to those skilled in the art that various changes and modifications may be made without departing from the spirit and scope of the present disclosure.

FIG. 1 is a block diagram schematically illustrating an image sensor according to an exemplary embodiment. Referring to FIG. 1, an image sensor 100 includes an active pixel sensor (APS) array 110, a row decoder 120, a correlated double sampler (CDS) 130, an analog-to-digital converter (ADC) 140, an output buffer 150, a column decoder 160, and a timing controller 170.

The active pixel sensor array 110 includes a plurality of pixels arranged in a two-dimensional structure. Each pixel converts a light signal into an electrical signal. The active pixel sensor array 110 is driven by driving signals such as a selection signal SEL, a reset signal RS, and a transfer signal TG from the row decoder 120. Also, electrical signals sensed by the pixels in response to the driving signals are provided to the correlated double sampler 130 through a plurality of column lines CL0 to CLm−1.

The row decoder 120 selects one row of the active pixel sensor array 110 according to a control of the timing controller 170. The row decoder 120 generates the selection signal SEL to select one of a plurality of rows. The row decoder 120 sequentially activates the reset signal RS and the transfer signal TG on pixels corresponding to the selected row. In this case, analog types of reference signals REF and image signals IMG generated from each of pixels in the selected row are sequentially transferred to the correlated double sampler (CDS) 130.

The correlated double sampler (CDS) 130 samples and holds a set of reference signals REF and image signals IMG provided to each of the column lines CL0 to CLm−1 from the active pixel sensor array 110. That is, the correlated double sampler (CDS) 130 samples and holds levels of the reference signals REF and image signals IMG corresponding to each column. The correlated double sampler (CDS) 130 provides the analog-to-digital converter (ADC) 140 with the sampled sets of reference signals REF and image signals IMG of the respective columns by a unit of columns according to a control of the timing controller 170.

The analog-to-digital converter (ADC) 140 converts a correlated double sampling signal REF/IMG on each column output from the correlated double sampler (CDS) 130 into a digital signal. In the event that image data is generated using the correlated double sampling signal REF/IMG on each column, a noise on each column is removed. In particular, the analog-to-digital converter (ADC) 140 of the inventive concepts includes a column shared operator 145. The column shared operator 145 is an arithmetic logic operation block that calculates a difference value of the correlated double sampling signal REF/IMG. In particular, the column shared operator 145 processes a correlated double sampling signal set in a time division manner with respect to two or more columns. Digital conversion operations on respective columns are dispersed by a function of the column shared operator 145. For example, as digital conversion operations on respective columns are dispersed, a decrease in chip area and power consumption is expected.

The output buffer 150 latches a column unit of image data provided by the analog-to-digital converter (ADC) 140. The output buffer 150 temporarily stores image data output from the analog-to-digital converter (ADC) 140 according to a control of the timing controller 170 and then outputs image data sequentially latched by the column decoder 160.

The column decoder 160 selects columns of the output buffer 150 according to a control of the timing controller 170. The output buffer 150 sequentially outputs image data stored by a column unit.

The image sensor 100 according to an exemplary embodiment is schematically described. In particular, the analog-to-digital converter (ADC) 140 includes the column shared operator 145 that calculates a difference value between a reference signal REF and an image signal IMG corresponding to each column. The column shared operator 145 may include a plurality of arithmetic operations (not shown) for calculating a difference value between a reference signal REF and an image signal IMG corresponding to two or more columns. Thus, as the column shared operator 145 performs a digital conversion operation on each of columns in a time division manner, a current peak is dispersed. In addition, since an arithmetic operator is shared by two or more columns, a chip area is remarkably reduced.

Figure 2:
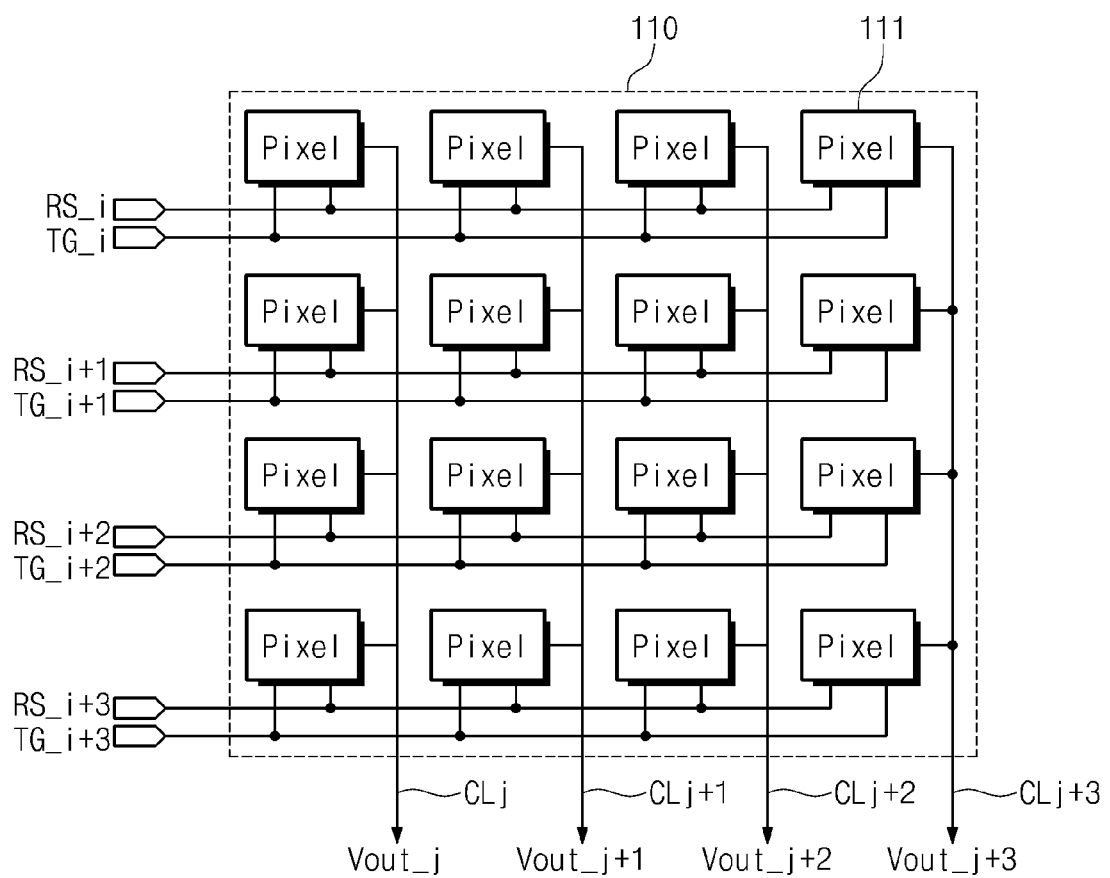
FIG. 2 is a block diagram schematically illustrating an active pixel sensor array according to an exemplary embodiment.

FIG. 2 is a block diagram schematically illustrating an active pixel sensor array according to an exemplary embodiment. Referring to FIG. 2, an active pixel sensor array 110 includes pixel sensors 111 arranged in a matrix form of rows and columns.

Each pixel sensor of the active pixel sensor array 110 may include at least one of a red filter, a green filter, and a blue filter. The red filter passes a light having a red wavelength band, the green filter passes a light having a green wavelength band, and the blue filter passes a light having a blue wavelength band. In addition, a pixel sensor 111 may include a plurality of transistors and a photoelectric transformation element. Each pixel sensor 111 senses a light using the photoelectric transformation element and converts the sensed light into an electrical signal. The converted signal is output to a column line CL.

If a reset signal RS_i and a transfer signal TG_i are provided with respect to a selected row (e.g., an ith row) of an active pixel sensor array 110, voltage signals Vout_j, Vout_j+1, Vout_j+2, and Vout_j+3 corresponding to the reset signal RS_i and the transfer signal TG_i are output to each column line CLj of the selected row. The voltage signals Vout_j, Vout_j+1, Vout_j+2, and Vout_j+3 may be provided to a correlated double sampler (CDS) 130 so as to be sampled as a reference signal REF and an image signal IMG.

Figure 3:
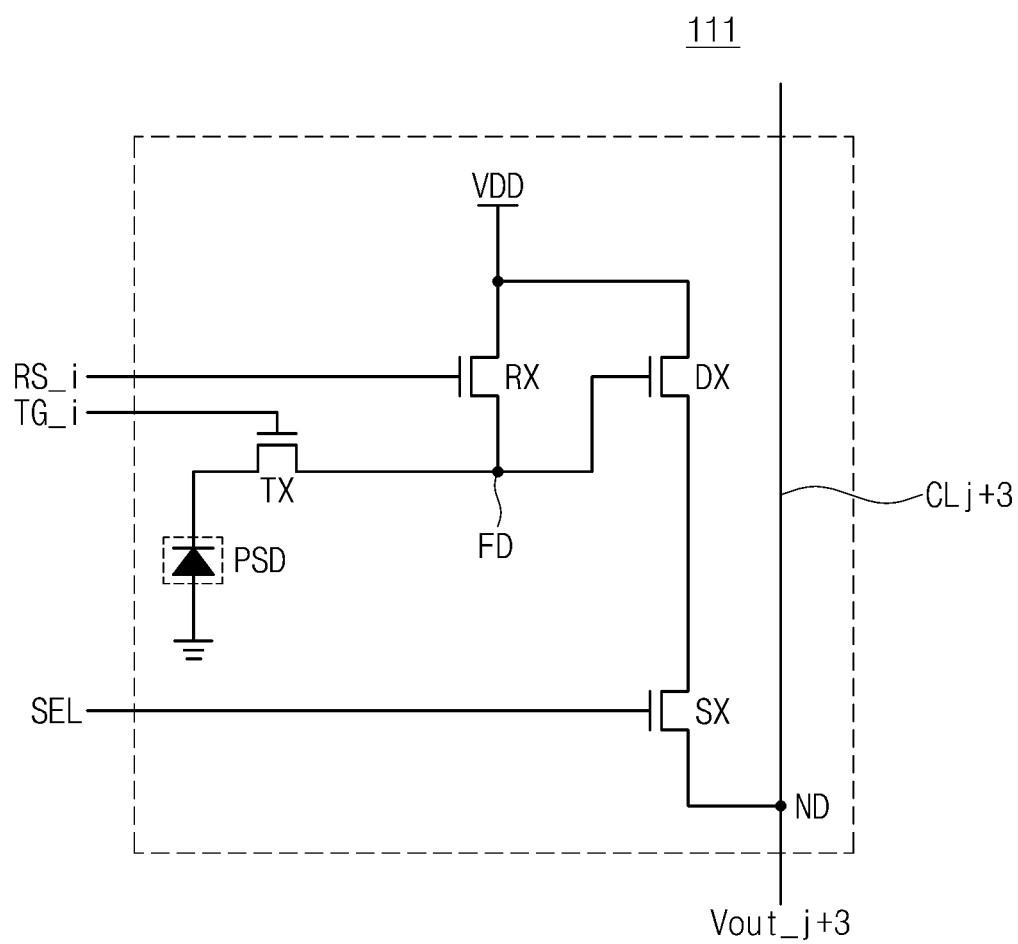
FIG. 3 is a circuit diagram schematically illustrating an active pixel sensor APS of the active pixel sensor array shown in FIG. 2, according to an exemplary embodiment.

FIG. 3 is a circuit diagram schematically illustrating an active pixel sensor (APS) of the active pixel array shown in FIG. 2, according to an exemplary embodiment. FIG. 3 shows as an example the upper right APS 111 in FIG. 2. Referring to FIG. 3, the active pixel sensor 111 includes a photoelectric transformation element (PSD) and four NMOS transistors TX, RX, DX, and SX.

The photoelectric transformation element PSD is a photosensing element that generates and integrates charges according to the amount of incident light or the strength of light. The photoelectric transformation element PSD may be implemented by a photo diode, a photo transistor, a photo gate, a pined photo diode (PPD), etc.

A transfer transistor TX transfers charges integrated by the photoelectric transformation element PSD to a floating diffusion area (FD). The transfer transistor TX is in general, formed of one transistor and is switched in response to a transfer signal TG_i provided from a row decoder 120.

The floating diffusion area FD has a function of detecting charges corresponding to the amount of incident light. The floating diffusion area FD accumulates charges provided from the photoelectric transformation element PSD during a time when the transfer signal TG_i is activated. The floating diffusion area FD is connected to a gate of a drive transistor DX that is driven by a source follower amplifier. The floating diffusion area FD is supplied with a power supply voltage VDD by a reset transistor RX.

A reset transistor RX resets the floating diffusion area FD in response to a reset signal RS_i. A source of the reset transistor RX is connected to the floating diffusion area FD, and a drain thereof is connected to the power supply voltage VDD. If the reset transistor RX is turned on by a bias provided by the reset signal RS_i, the power supply voltage VDD connected to the drain of the reset transistor RX is transferred to the floating diffusion area FD. In this case, charges accumulated at the floating diffusion area FD are transferred to the power supply voltage VDD, and a voltage of the floating diffusion area FD is reset.

The drive transistor DX acts as a source follower amplifier, and amplifies a variation of an electrical potential of the floating diffusion area FD to output the variation of the electrical potential through an output line as a sensing voltage Vout, in this case Vout_j+3.

A selection transistor SX selects a pixel sensor to be read by a row unit. The selection transistor SX is driven by a selection signal SEL provided by a row unit. When the selection transistor SX is turned on, a potential of the floating diffusion area FD amplified by the drive transistor DX is transferred to a drain of the selection transistor SX. Driving signal lines TG_i, RS_i, and SEL of the transistors TX, RS, and SX may be extended in a row direction (e.g., a horizontal direction) such that unit pixels included in the same row are simultaneously driven.

Figure 4:
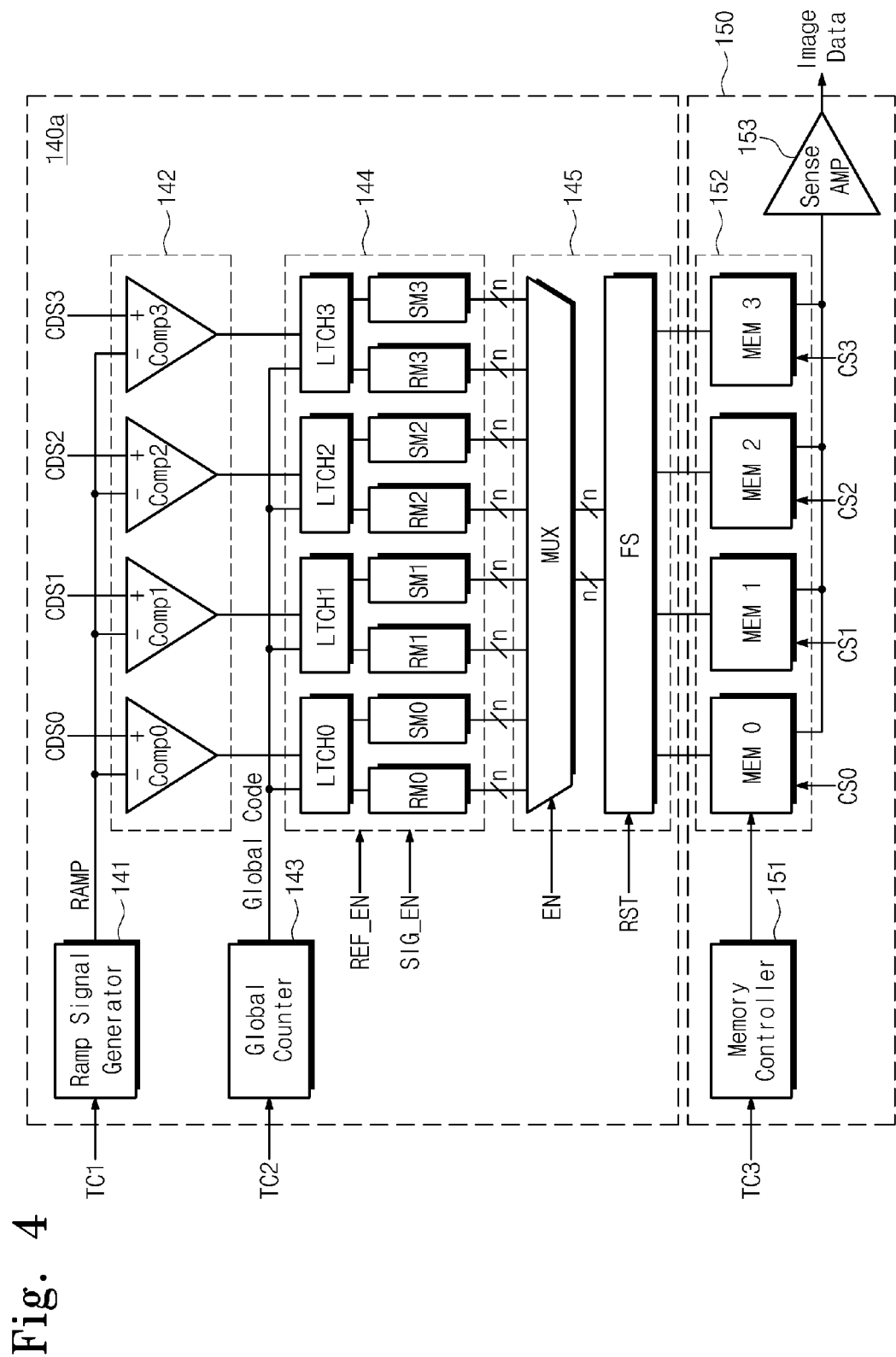
FIG. 4 is a block diagram schematically illustrating an analog-to-digital converter of the image sensor shown in FIG. 1, according to an exemplary embodiment.

FIG. 4 is a block diagram schematically illustrating an analog-to-digital converter (ADC) of the image sensor shown in FIG. 1, according to an exemplary embodiment. Referring to FIG. 4, an analog-to-digital converter 140a comprises a ramp signal generator 141, a comparator 142, a global counter 143, a latch unit 144, and a column shared operator 145. An output buffer 150 (See FIG. 1) comprises a memory controller 151, a column memory 152, and a sense amplifier 153 and is connected to the analog-to-digital converter 140a.

The ramp signal generator 141 outputs a ramp signal RAMP having a constant rising or falling slope in response to a control signal TC1 provided from a timing controller 170 (refer to FIG. 1). That is, the ramp signal generator 141 sequentially generates the ramp signal RAMP having a particular slope in response to a control of the timing controller 170. A reference signal REF held by a correlated double sampler (CDS) 130 through comparison with the ramp signal RAMP is converted into time-axis length information. In addition, an image signal IMG held by the correlated double sampler (CDS) 130 through comparison with the ramp signal RAMP is converted into time-axis length information. A waveform of the ramp signal RAMP will be more fully described with reference to FIG. 5.

The comparator 142 comprises a plurality of comparators Comp0, Comp1, Comp2, and Comp3 respectively corresponding to columns of an active pixel sensor array. The comparator 142 compares the ramp signal RAMP with correlated double sampling signals CDS0, CDS1, CDS2, and CDS3 respectively corresponding to columns. Here, each of the correlated double sampling signals CDS0, CDS1, CDS2, and CDS3 are sampled by a correlated double sampling operation and comprises held reference signal REF and image signal IMG.

Referring to the first comparator Comp0, the ramp signal RAMP is provided to an inverting input (−) of the first comparator Comp0, and the correlated double sampling signal CDS0 is provided to a non-inverting input (+) of the first comparator Comp0. During a first period, the first comparator Comp0 compares the ramp signal RAMP with the reference signal REF of the correlated double sampling signal CDS0 and provides a comparison result to a latch LTCH0. During a second period, the first comparator Comp0 compares the ramp signal RAMP with the image signal IMG of the correlated double sampling signal CDS0 and provides a comparison result to the latch LTCH0. The remaining comparators Comp1, Comp2, and Comp3 perform comparing operations in the same manner as described with reference to the first comparator Comp0. Through the above-described comparing operations, the comparator 142 converts the correlated double sampling signals CDS0, CDS1, CDS2, and CDS3 respectively corresponding to columns into time-axis length information.

The global counter 143 generates a global code in response to a control signal TC2 provided from the timing controller 170. The global code, for example, is provided as a binary code that is up-counted or down-counted in a bit-width (10-bit) or BCD code form. The global counter 143 generates the global code that is up-counted on the basis of a time point when a level of the ramp signal RAMP starts to be decreased. The global code is provided to latch circuits LTCH0, LTCH1, LTCH2, and LTCH3 respectively corresponding to columns. The number of counters included in the analog-to-digital converter 140a is minimized through the global counter 143.

The latch unit 144 stores global code values corresponding to the reference signal REF and the image signal IMG based on the comparison result. The reference signal REF and the image signal IMG of each column converted to time-axis length information through the comparator 142 are obtained as a code value capable of being arithmetically operated, by the latch unit 144. That is, the latch unit 144 latches a count number corresponding to time-axis length information that is obtained by converting the correlated double sampling signals CDS0, CDS1, CDS2, and CDS3 through the comparator 142. That is, the latch unit 144 latches code values corresponding to the reference signal REF and the image signal IMG of each of the correlated double sampling signals CDS0, CDS1, CDS2, and CDS3. Here, a reference code X and an image code Y are described which are acquired from a correlated double sampling signal CDS0 by the first latch LTCH0. An operation of the latch unit 144 is described using a first reference memory RM0 where the reference code X is stored and a first image memory SM0 where the image code Y is stored.

First, the correlated double sampling signal CDS0 converted to a time-axis signal by the first comparator Comp0 according to a control of the timing controller 170 is output. A global code value (hereinafter, referred to as a reference code when discussed with respect to the reference signal REF) corresponding to a width of a reference signal REF converted to a time-axis signal is captured by the first latch LTCH0. The reference code X captured is stored in the first reference memory RM0 in response to a control signal REF_EN. Then, a global code value (hereinafter, referred to as an image code when discussed with respect to the image signal IMG) corresponding to a width of an image signal IMG converted to a time-axis signal is captured by the first latch LTCH0. The image code Y captured is stored in the first image memory SM0 in response to a control signal SIG_EN. Correlated double sampling signals respectively corresponding to all columns are converted to a reference code X and an image code Y corresponding to each of columns in the above-described manner, and the reference codes X and the image codes Y corresponding to the columns are stored in reference memories RM0, RM1, RM2, and RM3 and image memories SM0, SM1, SM2, and SM3, respectively.

The column shared operator 145 processes reference codes X and image codes Y, corresponding to each of columns, stored respectively in the reference memories RM0, RM1, RM2, and RM3 and image memories SM0, SM1, SM2, and SM3, and outputs image data as a consequence of the processing. In each column, the column shared operator 145 subtracts a reference signal REF from an image signal IMG to output noise-free image data. Thus, in each column, the column shared operator 145 may be desirably formed of a subtractor that subtracts a reference code X from an image code Y.

In particular, the column shared operator 145 of the inventive concepts is configured such that one operator block processes two or more image signals IMG. In FIG. 4, there is illustrated an exemplary embodiment where the column shared operator 145 is shared by four columns. The column shared operator 145 sequentially selects columns to perform a subtract operation on each column. Four subtract operations performed on columns by the column shared operator 145 are dispersed.

In detail, the column shared operator 145 comprises a multiplexer MUX and a full subtractor FS. The multiplexer MUX sequentially selects columns in response to a control signal EN provided from the timing controller 170. The full subtractor FS performs full subtractors FS1 and FS2 on an n-bit reference code X and an n-bit image code Y provided from the reference memory RMi and the image memory SMi corresponding to the selected column. Operations on four columns are sequentially performed by the full subtractor FS. Image data corresponding to each column and calculated by the full subtractor FS is stored in a column memory 152 of the output buffer 150.

The output buffer 150 comprises a memory controller 151, column memories MEM0, MEM1, MEM2, and MEM3, and a sense amplifier 153. The column memories MEM0, MEM1, MEM2, and MEM3 store image data respectively corresponding to columns. The memory controller 151 controls an input/output operation of a memory MEM0, MEM1, MEM2, and MEM3 in response to a control signal TC3 from the timing controller 170. Image data stored in the column memories MEM0, MEM1, MEM2, and MEM3 is sequentially transferred to the sense amplifier 153 according to a control of a column decoder 160 (refer to FIG. 1) for an output to an external device.

There is described above an exemplary embodiment of the analog-to-digital converter 140a of an image sensor 100 that comprises the column shared operator 145. There is described above an exemplary embodiment where the column shared operator 145 is shared by four columns. There is described above an exemplary embodiment where the column shared operator 145 comprises the multiplexer MUX for sequentially selecting columns and the full subtractor FS. However, the inventive concepts are not limited thereto.

Figure 5:
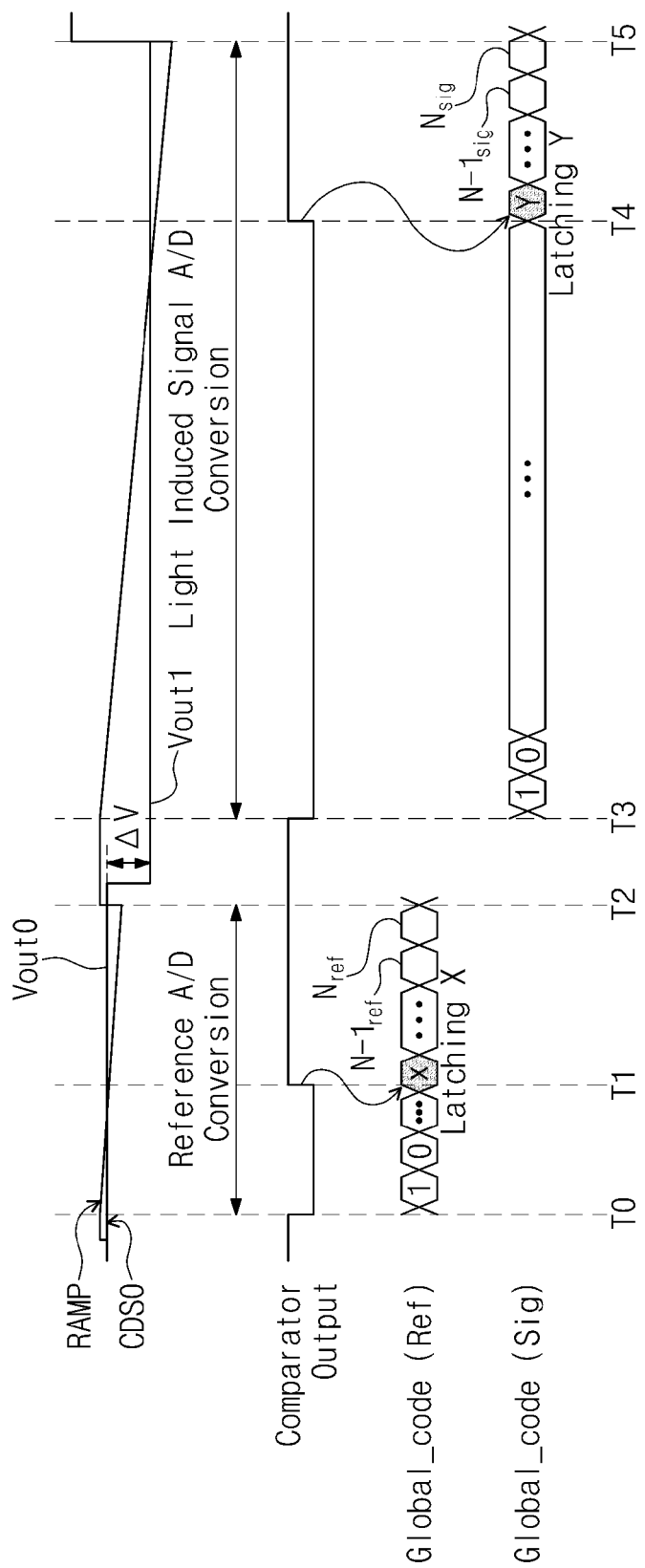
FIG. 5 is a timing diagram schematically illustrating operations of a comparator and a latch unit of the analog-to-digital converter shown in FIG. 4, according to an exemplary embodiment.

FIG. 5 is a timing diagram schematically illustrating operations of a comparator and a latch unit shown in FIG. 4, according to an exemplary embodiment. Operations of converting voltage signals Vout0 and Vout1 respectively corresponding to a reference signal REF and an image signal IMG to time-axis information and converting the time-axis information to a code value corresponding to a time-axis length are described with reference to FIG. 5.

The analog-to-digital converter 140 receives correlated double sampling signals CDS0, CDS1, CDS2, and CDS3 on respective columns from a correlated double sampler (CDS) 130. A correlated double sampling signal CDS0 corresponding to a column is exemplarily described. The analog-to-digital converter 140 processes remaining correlated double sampling signals CDS 1, CDS2, and CDS3 in the same manner. The input correlated double sampling signal CDS0 is transferred to a non-inverting input (+) of a comparator Comp0. A ramp signal RAMP is provided to an inverting input (−) of the comparator Comp0.

An operation period for converting an analog type of correlated double sampling signal CDS0 to a digital signal is divided into two periods. One period is a period where a reference signal REF of the correlated double sampling signal CDS0 is converted to a digital signal and corresponds to a period between T0 to T2 in FIG. 5. The other period is a period where an image signal IMG of the correlated double sampling signal CDS0 is converted to a digital signal and corresponds to a period between T3 to T5 in FIG. 5.

A slope of the ramp signal RAMP descends from T0. At the same time, the comparator Comp0 is activated and a count-up operation of a global counter 143 starts. An output Comp_out of the comparator Comp0 maintains a low level during a period between T0 and T1 where a level of the ramp signal RAMP is higher than that Vout0 of the correlated double sampling signal CDS0. However, the Vout0 of the correlated double sampling signal CDS0 becomes higher than that of the descending ramp signal RAMP from T1. Thus, the output Comp_out of the comparator Comp0 transitions to a high level at T1.

At T1, a latch unit 144 stores an up-counted global code value X in a first latch LCH0. The global code value X stored in the first latch LCH0 corresponds to a digital signal value corresponding to the reference signal REF, that is, a reference code X. The reference code X is stored in a first reference memory RM0. An operation period where the reference signal REF is converted to a digital signal is terminated at T2.

At T2, initialization of the ramp signal RAMP and the global code is performed. That is, the ramp signal RAMP is raised toward a level of an initial ramp signal (i.e., in this example, the level at time T0), and the global counter 143 is reset. Thus, an image signal IMG of the correlated double sampling signal CDS0 is provided to the comparator Comp0. At this time, since the image signal IMG is a pixel signal where an incident light exists, a level Vout1 of the correlated double sampling signal CDS0 corresponding to the image signal IMG is relatively low.

A level of the ramp signal RAMP starts to descend along a time axis from T3. Counting of the global counter 143 reset is performed from T3. A decrease in the ramp signal RAMP and a counting operation of the global counter 143 are maintained until T5. A comparison operation of the comparator Comp0 is activated from T4 until T5. The output Comp_out of the comparator Comp0 maintains a low level during a period between T3 and T4 where a level of the ramp signal RAMP is higher than that Vout1 of the correlated double sampling signal CDS0. However, the Vout1 of the correlated double sampling signal CDS0 becomes higher than that of the descending ramp signal RAMP from T4. Thus, the output Comp_out of the comparator Comp0 transitions to a high level at T4.

At T4, the latch unit 144 stores a global code value Y in the first latch LTCH0 in response to a transition of the output Comp_out of the comparator Comp0. An image code Y stored in the first latch LTCH0 is a digital value corresponding to an analog image signal IMG. The image signal Y is stored in a first image memory SM0. A period where the image signal IMG is converted to a digital signal is terminated at T5.

Global code values X and Y respectively corresponding to the reference signal REF and the image signal IMG are obtained and correlated-double-sampled from T0 until T5. Global code values X and Y on all columns are obtained at the same time. Global code values X and Y on respective columns are stored in a reference memory RMi (i being a column address) and an image memory SMi in the latch unit 144 in response to control signals REF_EN and SIG_EN.

As a result, the global counter 143 performs an up-counting operation at falling times T0 and T3 of the ramp signal RAMP. In addition, a comparison operation of the comparator 142 is activated such that a comparison result Comp_out is output as a consequence of comparing the ramp signal RAMP and the correlated double sampling signal CDSi. Latches LTCH0, LTCH1, LTCH2, and LTCH3 of the latch unit 144 latch global code values X and Y at times T1 and T4 when the comparison result Comp_out transitions from a low level to a high level. The global code values X and Y are stored in the reference memory RMi and the image memory SMi, respectively. The ramp signal RAMP and the global code are generated under a control of a timing controller 170.

Figure 6:
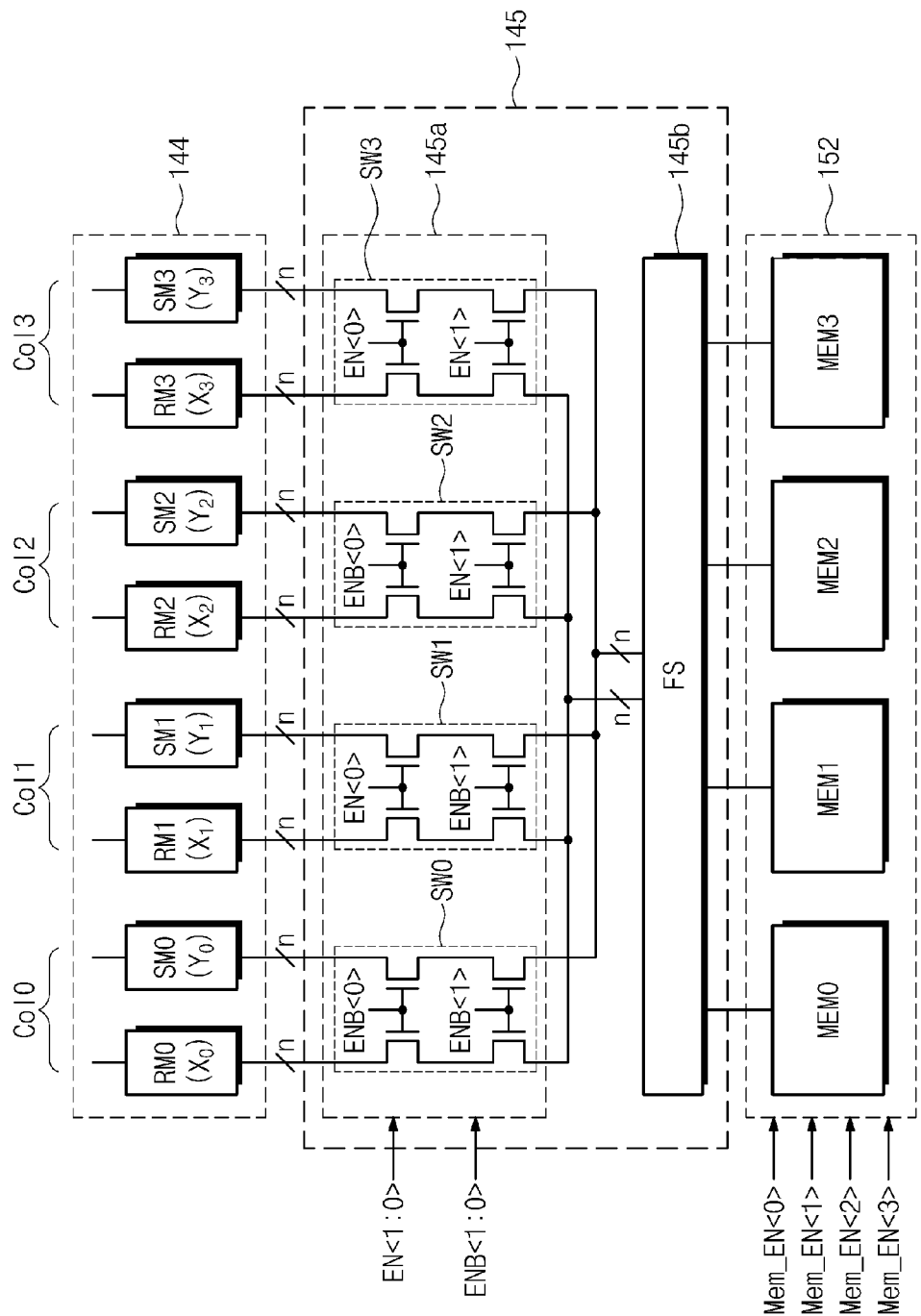
FIG. 6 is a block diagram schematically illustrating a column shared operator according to an exemplary embodiment.

FIG. 6 is a block diagram schematically illustrating a column shared operator according to an exemplary embodiment. Referring to FIG. 6, a column shared operator 145 comprises a multiplexer 145a and a full subtractor 145b for sharing of four columns. Here, the full subtractor 145b is exemplarily illustrated as a logical operation block. However, the full subtractor 145b may be formed of an adder, a subtractor, or an adder-subtractor.

Reference codes X respectively corresponding to reference signals REFi of correlated double sampling signals CDSi are stored in reference memories RMi of a latch unit 144, and image codes Y respectively corresponding to image signals IMGi of the correlated double sampling signals CDSi are stored in image memories SMi of the latch unit 144, as described above.

The multiplexer 145a selects one of columns shared. For example, the multiplexer 145a selects a column used to subtract a reference code X from an image code Y through the full subtractor 145b. It is assumed that each of the reference codes X and the image codes Y corresponding to columns is formed of n bits (n being an integer of 1 or more).

The multiplexer 145a is provided with selection signals EN<1:0> and ENB<1:0> from a timing controller 170 (refer to FIG. 1). The selection signals EN<1:0> and ENB<1:0> select one of four columns shared by the column shared operator 145. The selection signals ENB<1:0> are inverted versions of selection signals EN<1:0>. Switching operations of switches SW0, SW1, SW2, and SW3 of the multiplexer 145a are controlled by the selection signals EN<1:0> and ENB<1:0>. The first switch SW0 is turned on to transfer reference code X0 and image code Y0 corresponding to a first column Col0 to the full subtractor 145. The second switch SW1 is turned on to transfer reference code X1 and image code Y1 corresponding to a second column Col1 to the full subtractor 145. The third switch SW2 is turned on to transfer reference code X2 and image code Y2 corresponding to a third column Col2 to the full subtractor 145. The fourth switch SW3 is turned on to transfer reference code X3 and image code Y3 corresponding to a fourth column Col3 to the full subtractor 145.

Here, each of the switches SW0, SW1, SW2, and SW3 is understood to comprise n parallel paths to transfer an n-bit reference code X and an n-bit image code Y to the full subtractor 145b at the same time. For example, the first switch SW0 transfers an n-bit reference code X0 from a reference memory RM0 to the full subtractor 145b. At the same time, the first switch SW0 transfers an n-bit image code Y0 from an image memory SM0 to the full subtractor 145b. In FIG. 6, there is illustrated an exemplary embodiment where each of the switches SW0, SW1, SW2, and SW3 comprises two transistors. In each of the switches SW0, SW1, SW2, and SW3, an upper transistor, adjacent to the latch unit 144, from among two transistors, is controlled by an LSB value of a corresponding selection signal ENB<1:0>/EN<1:0>. In each of the switches SW0, SW1, SW2, and SW3, a lower transistor, adjacent to the latch unit 144, from among two transistors, is controlled by an MSB value of a corresponding selection signal ENB<1:0 >/EN<1:0>.

All transistors included in the first switch SW0 are turned on when two ones ENB<0> and ENB<1> of the selection signals EN<1:0> and ENB<1:0> have a value of '11'. That is, if two selection signals ENB<1:0> are '00', the first switch SW0 is turned on. All transistors included in the second switch SW1 are turned on when two ones EN<0> and ENB<1> of the selection signals EN<1:0> and ENB<1:0> have a value of '11'. That is, if two selection signals EN<0> and ENB<1> have a value of '01', the second switch SW1 is turned on. All transistors included in the third switch SW2 are turned on when two ones ENB<0> and EN<1> of the selection signals EN<1:0> and ENB<1:0> have a value of '11'. All transistors included in the fourth switch SW3 are turned on when two ones EN<0> and EN<1> of the selection signals EN<1:0> and ENB<1:0> have a value of '11'. However, a method of controlling the switches SW0, SW1, SW2, and SW3 is exemplary and may be variously changed.

The full subtractor 145b performs a subtract operation on a reference code X and an image code Y of a column selected by the multiplexer unit 145a. For example, the full subtractor 145b performs an operation where the reference code X is subtracted from the image code Y. The subtract operation of the full subtractor 145b is performed by a technique of adding 2's complement of the image code Y and the reference code X. At this time, an input carry C0 of the full subtractor 145b is set to a logical '1'.

An output of the full subtractor 145b is transferred to a column memory 152 of an output buffer 150. In the event that the subtract operation corresponds to a first column Col0, there is activated a control signal Mem_EN<0> provided from a memory controller 151. A subtract result Y0–X0 being an output of the full subtractor 145b is stored in a first column memory MEM0. In the event that the subtract operation corresponds to a second column Col1, there is activated a control signal Mem_EN<1> provided from the memory controller 151. A subtract result Y1–X1 being an output of the full subtractor 145b is stored in a second column memory MEM1. In the event that the subtract operation corresponds to a third column Col2, there is activated a control signal Mem_EN<2> provided from the memory controller 151. A subtract result Y2–X2 being an output of the full subtractor 145b is stored in a third column memory MEM2. In the event that the subtract operation corresponds to a fourth column Col3, there is activated a control signal Mem_EN<3> provided from the memory controller 151. A subtract result Y3–X3 being an output of the full subtractor 145b is stored in a fourth column memory MEM3.

A structure and a control method of the full subtractor 145b shared by four columns Col0 to Col3 are described. Here, a structure of the multiplexer 145a for sequentially selecting columns may be variously changed without limit to this disclosure. It is understood that the full subtractor 145b may be formed of various arithmetic and logical operation blocks shared by a plurality of columns.

Figure 7:
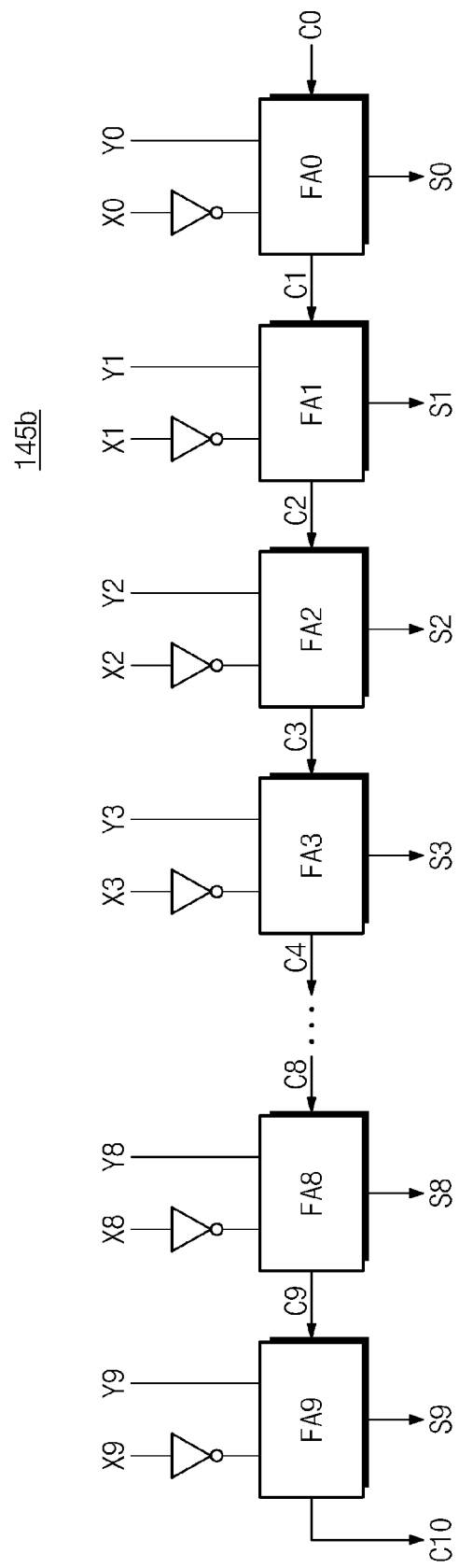
FIG. 7 is a block diagram schematically illustrating a full subtractor of the column shared operator shown in FIG. 6, according to an exemplary embodiment.

FIG. 7 is a block diagram schematically illustrating a full subtractor of the column shared operator shown in FIG. 6, according to an exemplary embodiment. Referring to FIG. 7, a full subtractor 145b comprises a plurality of full adders FA0 to FA9. In FIG. 7, there is illustrated an exemplary embodiment where each of a reference code X and an image code Y is 10-bit data. However, the inventive concepts are not limited thereto, and the number of bits of the bit data may be more or less than 10.

Bits Y0 to Y9 of the image code Y and inverted versions of bits X0 to X9 of the reference code X are provided the full adders FA0 to FA9 to subtract the reference code X from the image code Y. Here, the reference code X and the image code Y may correspond to a column. 2's complement of bits X0 to X9 of the reference code X are provided to the full adders FA0 to FA9, respectively. Thus, inverters are used to invert bits X0 to X9 of the reference code X. In addition, an input carry C0 of the full adder FA0 adding LSBs X0 and Y0 for a subtract operation using 2's complement is set to a logical '1'. Outputs S0 to S9 of the adders FA0 to FA9 are obtained as a subtract result of the image and reference codes Y and X. A carry C10 output from the full adder FA9 adding MSBs X9 and Y9 may be ignored.

A calculation result for each column of the full subtractor 145b formed of the full adders FA0 to FA9 and inverters may be sequentially stored in a selected column memory 152.

Figure 8:
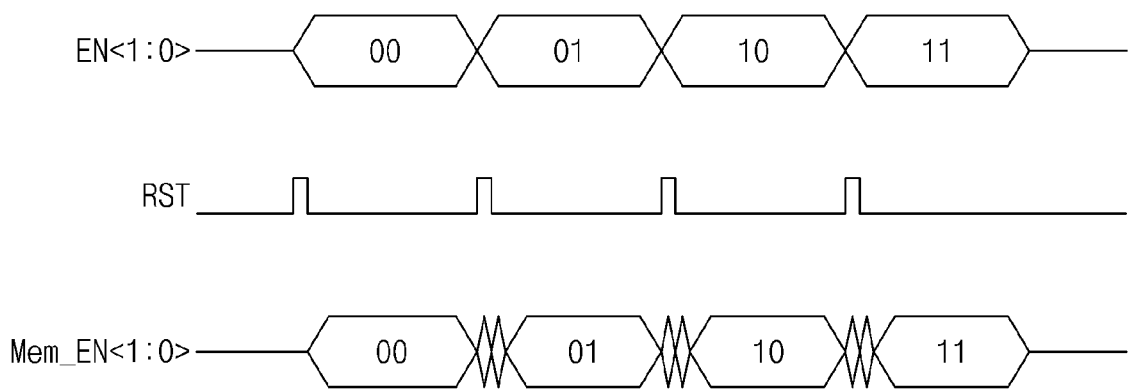
FIG. 8 is an example of a timing diagram schematically illustrating operations of the column shared operator shown in FIG. 6, according to an exemplary embodiment.

FIG. 8 is an example of a timing diagram schematically illustrating operations of the column shared operator shown in FIG. 6, according to an exemplary embodiment. A method of operating the multiplexer 145a and the full subtractor 145b of the column shared operator 145 is described with reference to FIG. 8.

First, a selection signal EN<1:0> having a value of '00' is provided from a timing controller 170 (refer to FIG. 1) to select an image code Y and a reference code X corresponding to a first column. However, a reset signal RST for resetting the full subtractor 145b may be provided prior to an input of the selection signal EN<1:0>. Alternatively, the full subtractor 145b may be reset after the selection signal EN<1:0> is received. After the full subtractor 145b is reset, the full subtractor 145b performs a subtract operation on an image code Y and a reference code X. A subtract result value loaded on an output terminal of the full subtractor 145b may be sequentially stored in column memories 152 in response to control signals Mem_EN<1:0> provided from a memory controller 151.

During a period where the selection signal EN<1:0> has a logical value of '00', the full subtractor 145b performs a subtract operation on the image code Y and the reference code X corresponding to the first column selected by the selection signal. A result of the subtract operation is stored in a first column memory MEM0. During a period where the selection signal EN<1:0> has a logical value of '01', the full subtractor 145b performs a subtract operation on the second column selected by the selection signal. A result of the subtract operation is stored in a second column memory MEM1. During a period where the selection signal EN<1:0> has a logical value of '10', the full subtractor 145b performs a subtract operation on the third column selected by the selection signal. A result of the subtract operation is stored in a third column memory MEM2. During a period where the selection signal EN<1:0> has a logical value of '11', the full subtractor 145b performs a subtract operation on the fourth column selected by the selection signal. A result of the subtract operation is stored in a fourth column memory MEM3.

In FIG. 8, there is illustrated a control signal in such a structure that a full subtractor 145b is shared by four columns. However, it is understood that a full subtractor 145b may be shared by five or more columns. That is, the number of columns that share the full subtractor 145b are not particularly limited.

Figure 9:
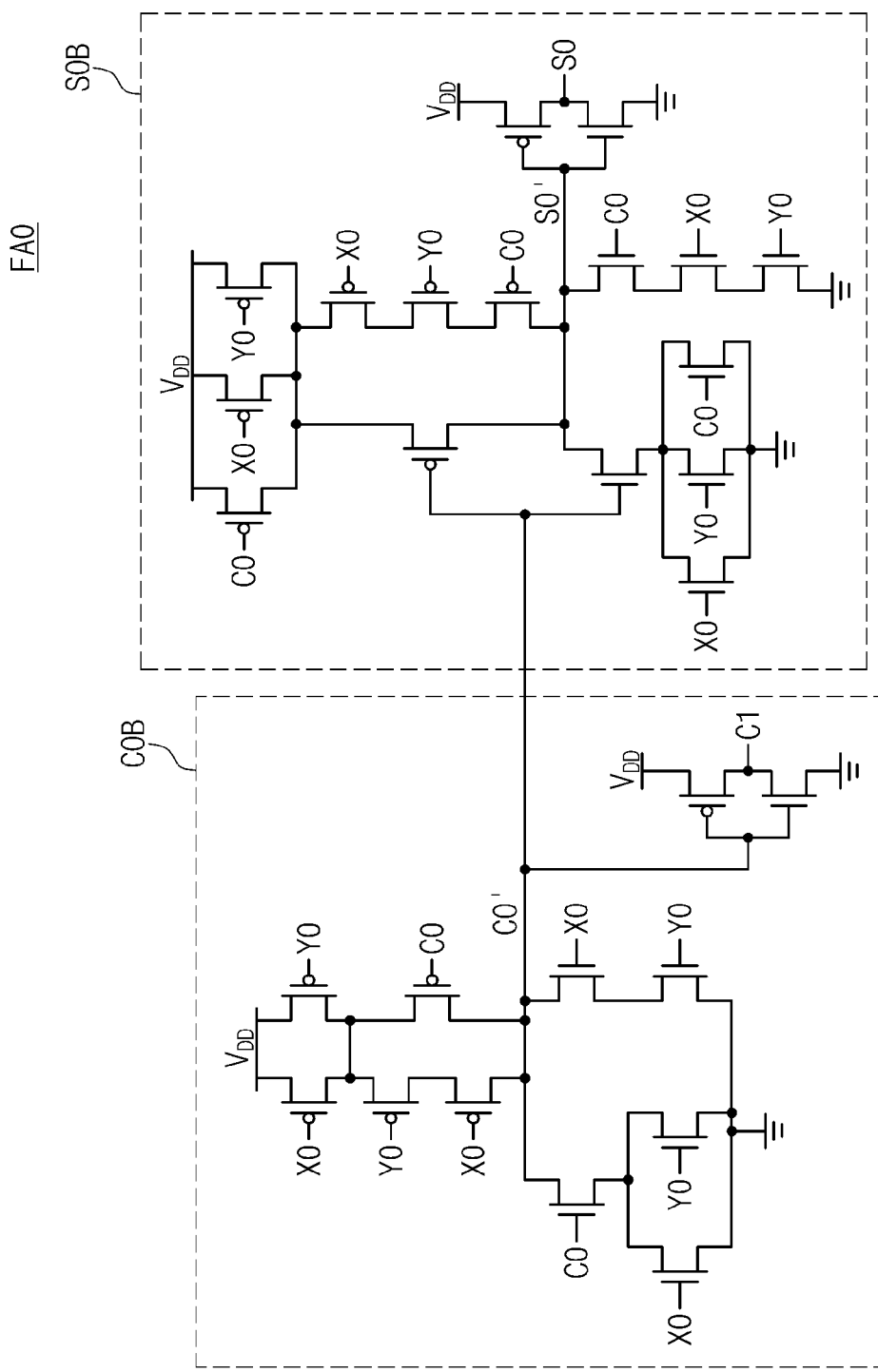
FIG. 9 is a circuit diagram schematically illustrating a full adder of the full subtractor shown in FIG. 7, according to an exemplary embodiment.

FIG. 9 is a circuit diagram schematically illustrating a full adder of the full subtractor shown in FIG. 7, according to an exemplary embodiment. Referring to FIG. 9, a transistor-level circuit diagram of the full adder FA0 shown in FIG. 7 is illustrated.

The full adder FA0 generates a sum S0 and an output carry C1 in response to inputs X0 and Y0 and an input carry C0. A Boolean equation on a sum S0 and an output carry C1 of the full adder FA0 is expressed by the following equation 1:

$$S_0 = X_0'Y_0'C_0 + X_0'Y_0C_0' + X_0Y_0'C_0' + X_0Y_0C_0$$

$$C_1 = X_0Y_0 + Y_0C_0 + X_0C_0 \quad (1)$$

A left-side transistor block COB is a logical operation block for calculating an output carry C1, and a right-side transistor block SOB is a logical operation block for calculating a sum S0. The full adder FA0 is formed of 28 MOS transistors to perform a full-adder operation corresponding to one bit. Thus, 280 MOS transistors are used to perform a 10-bit arithmetic operation.

The full subtractor 145b is shared by a plurality of columns. Thus, a chip area used to form an image sensor may be minimized by minimizing the number of full adders of the full subtractor 145b.

Figure 10:
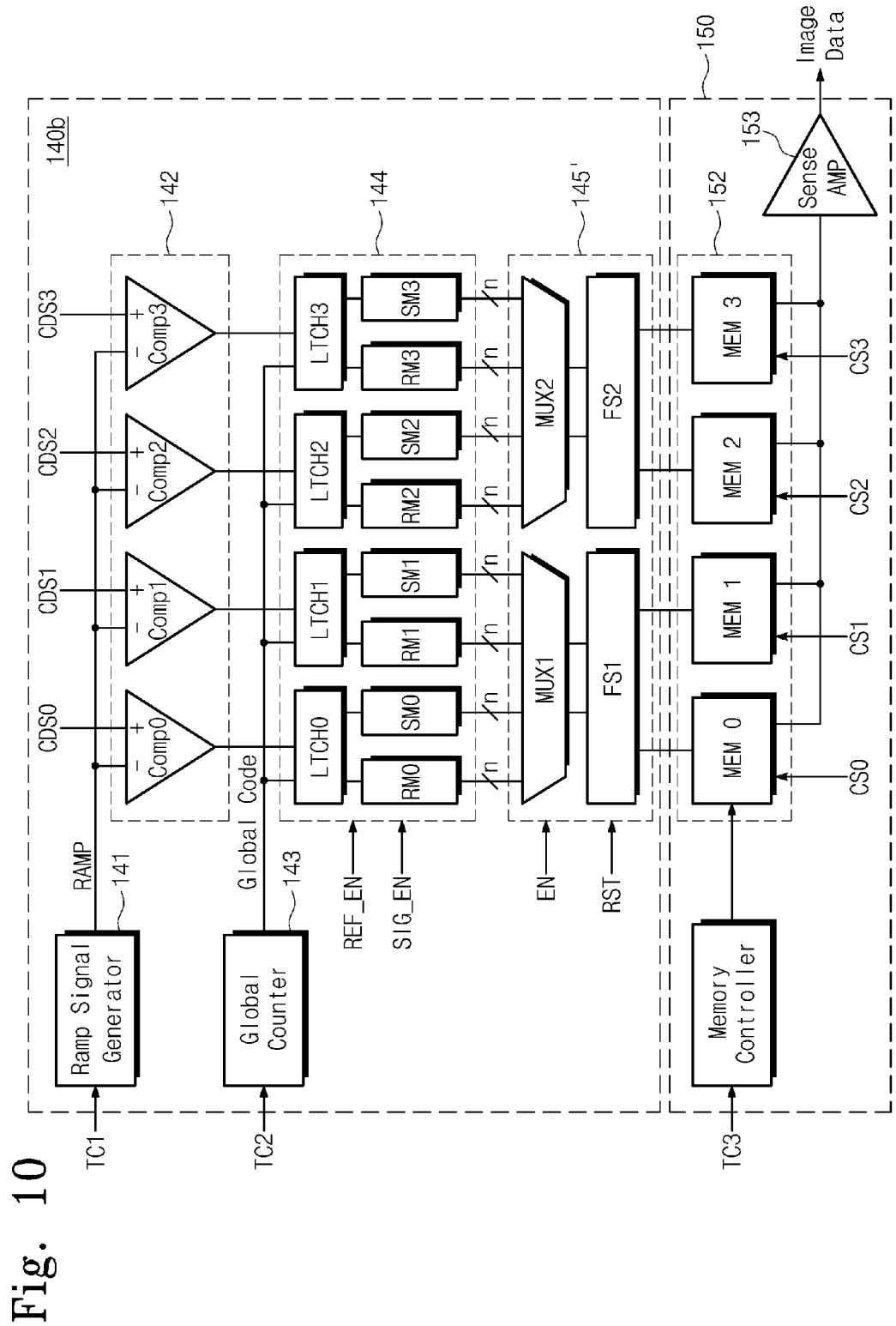
FIG. 10 is a block diagram schematically illustrating an analog-to-digital converter of the image sensor shown in FIG. 1, according to another exemplary embodiment.

FIG. 10 is a block diagram schematically illustrating an analog-to-digital converter of the image sensor shown in FIG. 1, according to another exemplary embodiment. Referring to FIG. 10, an analog-to-digital converter 140b comprises a ramp signal generator 141, a comparator 142, a global counter 143, a latch unit 144, and a column shared operator 145'. An output buffer 150 comprises a memory controller 151, a column memory 152, and a sense amplifier 153 and is connected to the analog-to-digital converter 140b. The column shared operator 145' is shared by two columns.

Here, the ramp signal generator 141, the comparator 142, the global counter 143, the latch unit 144 and the output buffer 150 operate substantially the same as those shown in FIG. 4, and a description thereof is thus omitted.

The column shared operator 145' processes reference codes X and image codes Y, corresponding to each of columns, stored respectively in reference memories RM0, RM1, RM2, and RM3 and image memories SM0, SM1, SM2, and SM3 and outputs image data as a consequence of the processing. In each column, the column shared operator 145' subtracts a reference signal REF from an image signal IMG to output noise-free image data.

The column shared operator 145' is implemented by a logical operation block shared by two columns. Thus, the column shared operator 145' sequentially selects two columns and sequentially performs a subtract operation on an image code Y and a reference code X of a selected column.

In detail, the column shared operator 145' comprises multiplexers MUX1 and MUX2 and full subtractors FS1 and FS2. The multiplexer units MUX1 and MUX2 sequentially select columns in response to a control signal EN provided from the timing controller 170. The full subtractors FS1 and FS2 perform a subtract operation on an n-bit reference code X and an n-bit image code Y provided from the reference memory RMi and the image memory SMi corresponding to the selected column. Operations on two columns are sequentially performed by the full subtractors FS1 and FS2. Image data corresponding to each column and calculated by the full subtractors FS1 and FS2 is stored in a column memory of the output buffer 150.

The output buffer 150 comprises the memory controller 151 to control an input/output operation of a memory in response to the control signal TC3 from the timing controller 170, the column memories MEM0, MEM1, MEM2, and MEM3 to store image data respectively corresponding to columns, and the sense amplifier 153. In a case where the full subtractors FS1 and FS2 are shared by two columns, respectively, the column memories MEM0 and MEM2 simultaneously store image data from the full subtractors FS1 and FS2, respectively, and the column memories MEM1 and MEM3 simultaneously store image data from the full subtractors FS1 and FS2, respectively.

There is described above an exemplary embodiment of the analog-to-digital converter 140b of an image sensor 100 that comprises the column shared operator 145'. There is described above an exemplary embodiment where the column shared operator 145' is shared by two columns. There is described above an exemplary embodiment where the column shared operator 145' comprises the multiplexers MUX1 and MUX2 for sequentially selecting columns and the full subtractors FS1 and FS2. However, the inventive concepts are not limited thereto.

Figure 11:
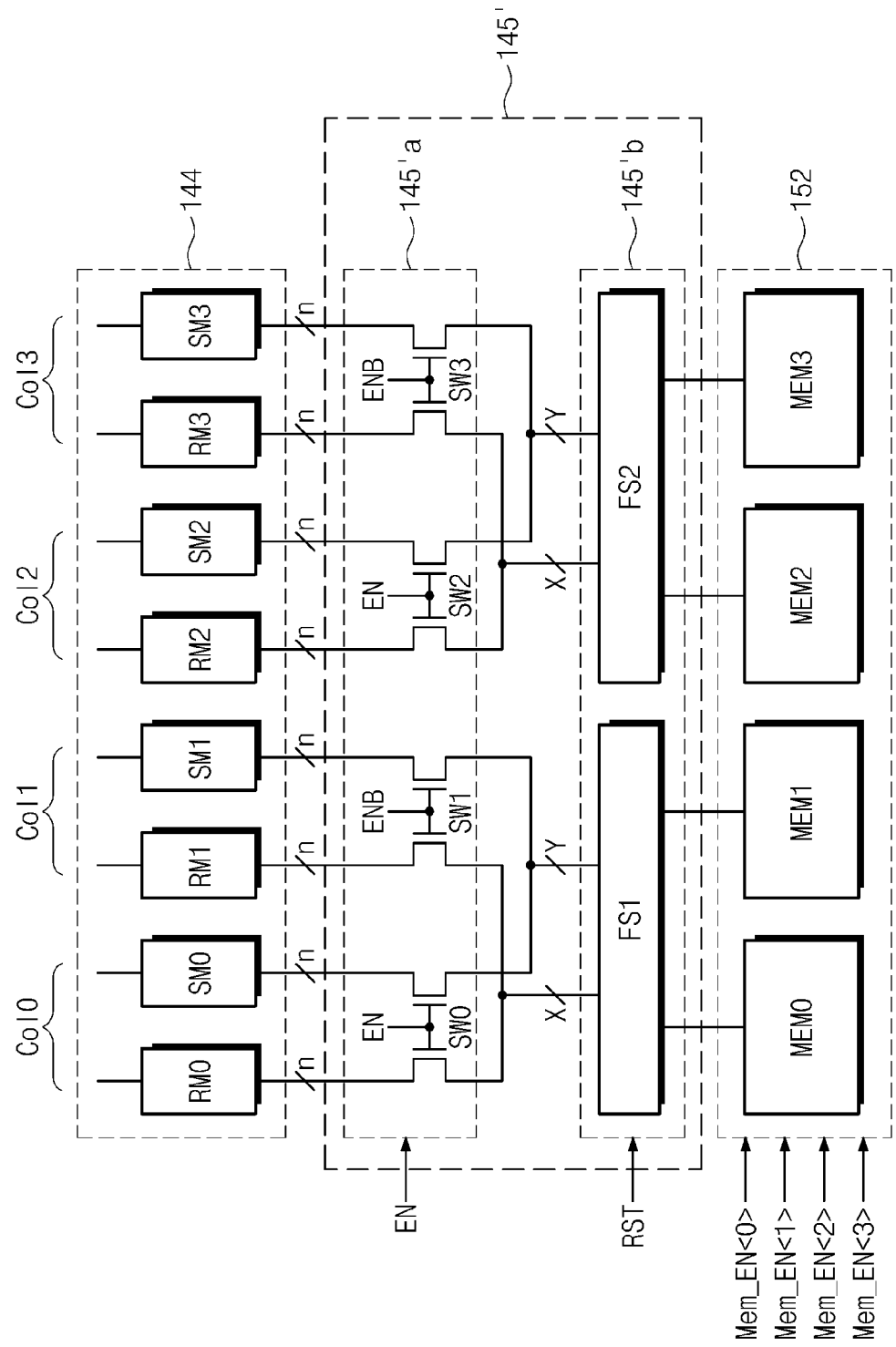
FIG. 11 is a block diagram schematically illustrating a column shared operator of the analog-to-digital converter shown in FIG. 10, according to an exemplary embodiment.

FIG. 11 is a block diagram schematically illustrating a column shared operator of the an analog-to-digital converter shown in FIG. 10, according to an exemplary embodiment. Referring to FIG. 11, the column shared operator 145' comprises a multiplexer 145'a and a full subtractor 145'b shared by two columns.

A reference code X corresponding to each column is stored in each reference memory RMi. An image code Y corresponding to each column is stored in each image memory SMi. The multiplexer 145'a selects one of two columns. For example, the multiplexer 145'a activates a group of switches SW0 and SW2 or a group of switches SW1 and SW3 in response to a control signal EN.

The switches SW0 and SW2 are turned on to simultaneously transfer a reference code X0 and an image code Y0 corresponding to a first column Col_0 to a full subtractor FS1, and a reference code X2 and an image code Y2 corresponding to a third column Col_2 to a full subtractor FS2. The switches SW1 and SW3 are turned on to simultaneously transfer a reference code X1 and an image code Y1 corresponding to a second column Col_1 to the full subtractor FS1, and a reference code X3 and an image code Y3 corresponding to a fourth column Col_3 to the full subtractor FS2.

Here, each of the switches SW0, SW1, SW2, and SW3 is understood to comprise n parallel paths to transfer an n-bit reference code X and an n-bit image code Y to the full subtractor 145b' at the same time. For example, the first switch SW0 transfers an n-bit reference code X0 from a reference memory RM0 to the full subtractor FS1. At the same time, the first switch SW0 transfers an n-bit image code Y0 from an image memory SM0 to the full subtractor FS1. That is, all transistors included in the first switch SW0 are turned on or off according to a selection signal EN.

The full subtractors FS1 and FS2 perform a subtract operation on a reference code X and an image code Y of a column selected by the multiplexer 145'a. For example, the full subtractor FS1 performs a subtract operation on the reference code X and the image code Y of one column selected from a first column Col_0 and a second column Col_1. The full subtractor FS2 performs a subtract operation on the reference code X and the image code Y of one column selected from a third column Col_2 and a fourth column Col_3. The subtract operation of each full subtractor is performed by a technique of adding 2's complement of the image code Y and the reference code X.

Outputs of the full subtractors FS1 and FS2 are transferred to the column memory 152 of the output buffer 150. In the event that the subtract operation corresponds to first and third columns Col_0 and Col_2, there are activated control signals Mem_EN<0> and Mem_EN<2> provided from a memory controller 151. Outputs of the full subtractors FS1 and FS2 are stored in first and third column memories MEM0 and MEM2, respectively. In the event that the subtract operation corresponds to second and fourth columns Col_1 and Col_3, there are activated control signals Mem_EN<1> and Mem_EN<3> provided from the memory controller 151. Outputs of the full subtractors FS1 and FS2 are stored in second and fourth column memories MEM1 and MEM3, respectively.

Figure 12:
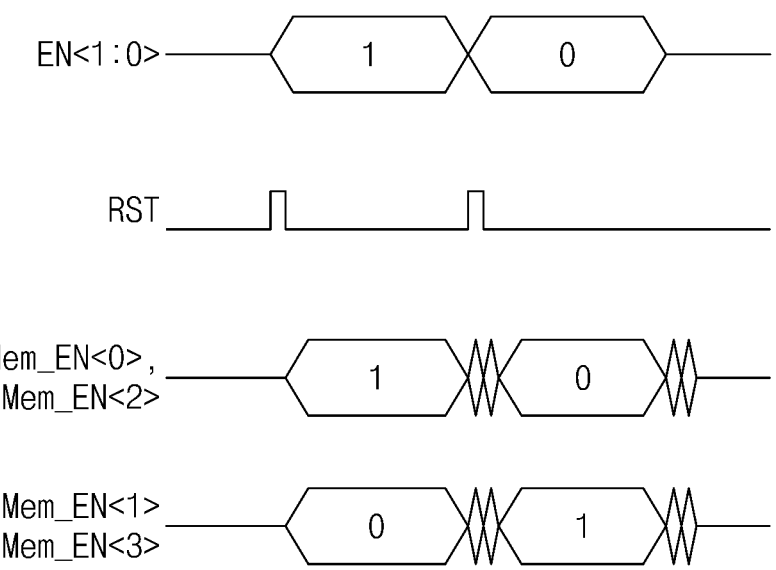
FIG. 12 is an example of a timing diagram schematically illustrating operations of the column shared operator shown in FIG. 11, according to an exemplary embodiment.

FIG. 12 is an examples of a timing diagram schematically illustrating operations of the column shared operator shown in FIG. 11, according to an exemplary embodiment. A method of operating the multiplexer 145'a and the full subtractor 145'b of the column shared operator 145' is described with reference to FIG. 12.

First, a selection signal EN having a value of '1' is provided from a timing controller 170 (refer to FIG. 10) to select an image code Y and a reference code X corresponding to a first column Col_0 and a third column Col_2. However, a reset signal RST for resetting full subtractors FS1 and FS2 may be provided prior to an input of the selection signal EN. Alternatively, the full subtractors FS1 and FS2 may be reset after the selection signal EN is received. After the full subtractors FS1 and FS2 are reset, the full subtractors FS1 and FS2 perform a subtract operation on the image code Y and the reference code X corresponding to the first column Col_0 and the third column Col_2. A subtract result value loaded on output terminals of the full subtractors FS1 and FS2 may be sequentially stored in column memories 152 in response to control signals Mem_EN<0> and Mem_EN<2> provided from a memory controller 151.

Then, a selection signal EN having a value of '0' is provided from the timing controller 170 to select an image code Y and a reference code X corresponding to a second column Col_1 and a fourth column Col_3. However, the reset signal RST for resetting the full subtractors FS1 and FS2 may be provided prior to an input of the selection signal EN. However, the full subtractors FS1 and FS2 may be reset after the selection signal EN is received. After the full subtractors FS1 and FS2 are reset, they perform a subtract operation on the image code Y and the reference code X corresponding to the second column Col_1 and the fourth column Col_3. A subtract result value loaded on output terminals of the full subtractors FS1 and FS2 may be sequentially stored in the column memories 152 in response to control signals Mem_EN<1> and Mem_EN<3> provided from the memory controller 151.

Figure 13:
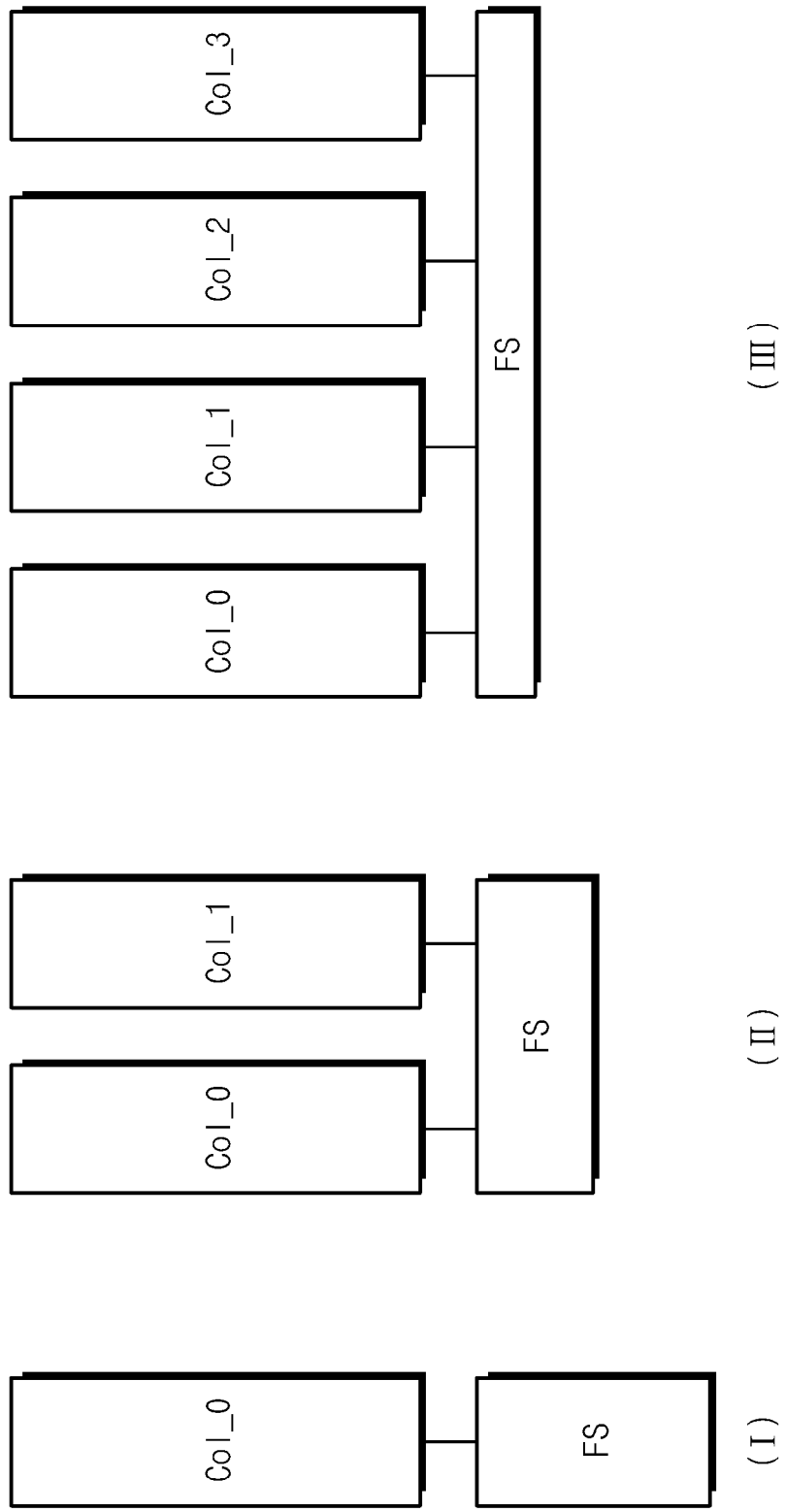
FIG. 13 is a diagram schematically showing an effect of the exemplary embodiments.

FIG. 13 is a diagram schematically showing an effect of the exemplary embodiments. In FIG. 13, there are shown a first case (I) where a full subtractor FS is used every column, a second case (II) where one full subtractor FS is shared by two columns, and a third case (III) where one full subtractor FS is shared by four columns.

Assuming that a full subtractor has the same area in the first to third cases (I), (II), and (III), an area of the full subtractor taken by one column is smallest in the third case (III).

Figure 14:
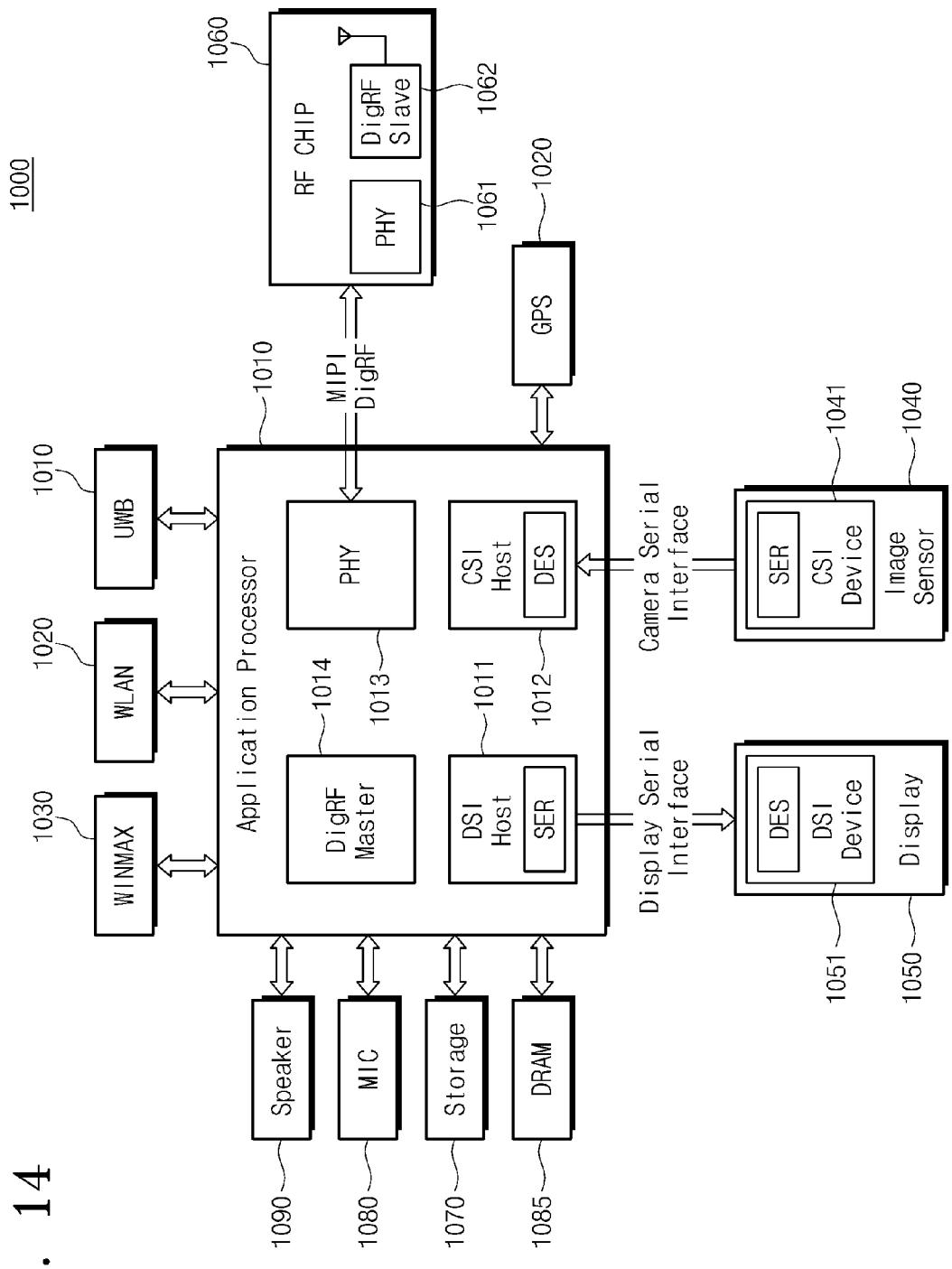
FIG. 14 is a block diagram schematically illustrating an electronic system including an image sensor according to an exemplary embodiment.

FIG. 14 is a block diagram schematically illustrating an electronic system including an image sensor according to an exemplary embodiment. Referring to FIG. 14, an electronic system 1000 may be implemented by a data processing device (e.g., a cellular phone, a PDA, a PMP, or a smart phone) using or supporting an MIPI (Mobile Industry Processor Interface) interface. The electronic system 1000 comprises an application processor 1010, a display 1050, and an image sensor 1040.

A CSI host 1012 included in the application processor 1010 performs serial communication with a CSI device 1041 of the image sensor 1040 through a CSI (Camera Serial Interface). At this time, an optical de-serializer is implemented in the CSI host 1012, and an optical serializer is implemented in the CSI device 1041.

A DSI host 1011 included in the application processor 1010 performs serial communication with a DSI device 1051 of a display 1050 through a DSI (Display Serial Interface). At this time, an optical serializer is implemented in the DSI host 1011, and an optical de-serializer is implemented in the DSI device 1051.

The electronic device 1000 further comprises a Radio Frequency (RF) chip 1060 capable of performing communications with the application processor 1010. For example, data is exchanged between the PHY 1061 of the RF chip 1060 and the PHY 1013 of the electronic system 1000 through an MIPI DigRF interface.

The electronic device 1000 further comprises GPS 1020, storage 1070, microphone 1080, DRAM 1085, and speaker 1090, and communicates using Wimax 1030, WLAN 1100, UWB 1110, and the like.

The image sensor 1040 may use an analog-to-digital converter corresponding to one of exemplary embodiments described herein. It is possible to improve noise and power consumption characteristics using a subtractor shared by two or more columns. In addition, a chip area is relatively reduced by reducing the number of subtractors used to implement the image sensor 1040.

With exemplary embodiments described herein, since a function of an analog-to-digital converter is shared by a plurality of columns, it is possible to reduce a chip area, power consumption, and noise.

While the inventive concept has been described with reference to exemplary embodiments, it will be apparent to those skilled in the art that various changes and modifications may be made without departing from the spirit and scope of the present invention. Therefore, it should be understood that the above exemplary embodiments are not limiting, but illustrative.

What is claimed is:
1. An image sensor comprising:
a pixel array having a plurality of active pixel sensors arranged in rows and columns;
a correlated double sampler configured to convert sensing signals transferred from pixel sensors selected from the plurality of active pixel sensors to correlated double sampling signals and to output a conversion result by column; and
an analog-to-digital converter configured to convert the correlated double sampling signals corresponding to a plurality of columns to digital signals using a global code,
wherein the analog-to-digital converter comprises a column shared operator that performs an arithmetic logic operation on a correlated double sampling signal set in a time division manner for two or more of the plurality of columns.

2. The image sensor of claim 1, wherein each of the correlated double sampling signals comprises a sampling value of a reference signal sensed under a condition where a light is not incident on the pixel sensor, and an image signal sensed under a condition where a light is incident on the pixel sensor.

3. The image sensor of claim 2, wherein the column shared operator is implemented by a subtractor that subtracts a global code value corresponding to the reference signal and the image signal of each of the two or more columns, through a logical operation.

4. The image sensor of claim 1, wherein the column shared operator comprises:
a multiplexer configured to select one of the two or more columns; and
an adder-subtractor configured to perform an addition or subtraction operation on a reference code and an image code of the column selected by the multiplexer.

5. The image sensor of claim 4, further comprising:
a latch unit configured to latch the reference code and the image code from a correlated double sampling signal corresponding to each column using the global code.

6. The image sensor of claim 4, wherein the adder-subtractor sequentially performs the addition or subtraction operation on the reference code and the image code with respect to the two or more columns.

7. The image sensor of claim 4, wherein the adder-subtractor adds 2's complement of the reference code and the image code.

8. The image sensor of claim 4, wherein the adder-subtractor subtracts the reference code from the image code.

9. The image sensor of claim 1, wherein the analog-to-digital converter comprises:
a ramp signal generator configured to generate a ramp signal for converting a level of the correlated double sampling signals to time-axis length information;
a plurality of comparators configured to compare the ramp signal with the correlated double sampling signals respectively corresponding to the plurality of columns;
a global counter configured to generate the global code, the global code being up-counted at the same time with a decrease in the ramp signal; and
a latch unit configured to latch a global code value corresponding to each column in response to a transition of an output voltage of each comparator.

10. The image sensor of claim 9, further comprising:
a timing controller configured to control a time point when the ramp signal generator generates the ramp signal and a time point when the global counter generates the global code.

11. An analog-to-digital converting method of an image sensor which converts a plurality of correlated double sampling signals sensed from a plurality of active pixel sensors in a correlated double sampling manner to image data, the method comprising:
comparing the plurality of correlated double sampling signals with a ramp signal;

generating a global code provided in common to each of the plurality of columns, the global code being up-counted or down-counted;

latching the global code corresponding to each column according to a result of comparing of the plurality of correlated double sampling signals and the ramp signal to acquire a reference code and an image code corresponding to each column; and performing an arithmetic operation on the reference code and the image code corresponding to each column using an adder-subtractor shared by two or more columns in a time-division manner and generating image data corresponding to each column.

12. The analog-to-digital converting method of claim 11, wherein the generating image data corresponding to each column comprises:

selecting the reference code and the image code corresponding to a first column of the plurality of columns to be provided to the adder-subtractor; and selecting the reference code and the image code corresponding to a second column of the plurality of columns to be provided to the adder-subtractor.

13. The analog-to-digital converting method of claim 11, further comprising:

sequentially storing image data of each column in a column memory corresponding to each column.

14. An analog-to-digital converting method of an image sensor comprising a plurality of analog-to-digital converters which convert signals sensed from a plurality of pixel sensors to digital image data, the method comprising:

selecting pixel sensors of the plurality of pixel sensors;

converting sensing signals transferred from the selected pixel sensors to correlated double sampling signals by column;

converting the correlated double sampling signals corresponding to a plurality of columns to digital signals using a global code;

and performing an arithmetic logic column shared operation on a correlated double sampling signal set in a time division manner for two or more of the plurality of columns.

* * * * *